Figure 1:
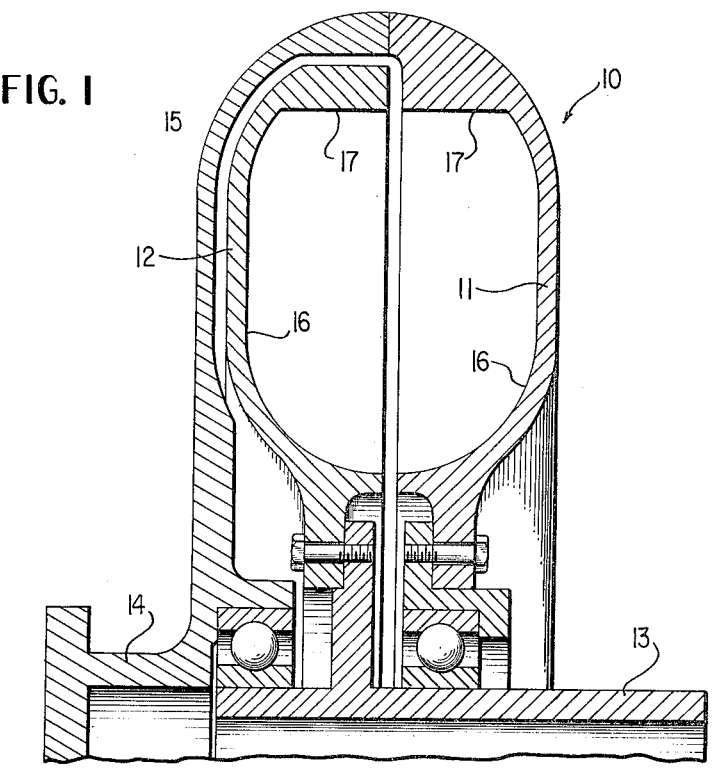

Aug. 24, 1965  G. HERTEL  3,201,940

HYDRODYNAMIC COUPLING

Filed Feb. 6, 1962

INVENTOR.
GOTTFRIED HERTEL

BY *Dicke and Craig*

ATTORNEYS.

United States Patent Office 3,201,940
Patented Aug. 24, 1965

3,201,940
HYDRODYNAMIC COUPLING
Gottfried Hertel, Stuttgart, Germany, assignor to Daimler-Benz Aktiengesellschaft, Stuttgart-Unterturkheim, Germany
Filed Feb. 6, 1962, Ser. No. 171,484
Claims priority, application Germany, Feb. 11, 1961, D 35,392
3 Claims. (Cl. 60—54)

The present invention relates to a hydrodynamic coupling, especially for the transmission of torque in motor vehicles, provided with means for influencing the outline of the curve representing operating characteristics thereof.

The use of hydrodynamic couplings in motor vehicles is known as such in the prior art. With these couplings there has always existed the desire, on the one hand, to keep the moment of the coupling when one of the members thereof is braked at standstill as small as possible and, on the other, to achieve within the range of small slippage as steep as possible a rise of the curve of the operating characteristics. This moment will be referred to hereinafter as standstill braking moment.

It has been attempted heretofore in the prior art to achieve such ends by installing or arranging in the flow circulation of the coupling some unevennesses or obstructions. More particularly, there were present within the shells of the hydrodynamic couplings of the prior art so-called deflection or impingement members usually made of sheet metal which interrupted the smooth internal walls of the shells and extended from the area thereof into the stream or flow of the coupling liquid. These sheet-metal deflection members or disks which were arranged predominantly along the inner diameter of the coupling shells reduced the standstill braking moment, however, they did not have the desired effect at all at small slippages. In particular, with couplings constructed in that manner, there occurred during starts under high load an annoying jerking action of the coupling.

The present invention proposes another solution for the elimination of the aforementioned disadvantages.

More particularly, the present invention maintains the smooth internal walls of the coupling shells, however, constructs these inner walls which face the liquid stream or flow in such a manner that they extend cylindrically or approximately cylindrically both in the primary and secondary shell along the outer boundary of the flow circulation. The term "cylindrical" is thereby not intended in connection with the present invention in its strictly mathematical sense. Instead slight departures therefrom permissive within the scope of the present invention are also intended to be encompassed herein. Thus, for example, a slightly conical construction, necessitated exclusively for technical casting reasons are still to be considered within the scope of such terminology.

Exhaustive experiments have clearly demonstrated that the same standstill brake moment may be achieved with a construction according to the present invention which has a smaller coupling diameter as compared to the known construction of the prior art utilizing deflection disks. Furthermore, a hydrodynamic coupling in accordance with the present invention offers the additional advantage that in particular the operating characteristics are modified to such an extent as to exhibit a curve having a steeper rise within the range of small slippages and surpasses by a considerable amount the characteristic curve of the known coupling provided with deflection disks down to values of slippages of approximately 30 to 40 percent. Additionally, no clutch jerks occur with the coupling in accordance with the present invention.

The cylindrical wall parts at both shells are disposed in accordance with the present invention along the same diameter. The transition of the inner walls into the cylindrical wall parts may take place either abruptly or gradually, for example, by corresponding rounded off portions.

Accordingly, it is an object of the present invention to provide the hydrodynamic coupling, especially for use in motor vehicles which effectively eliminates the shortcomings and inadequacies encountered with the prior art constructions.

It is another object of the present invention to provide by simple and inexpensive means a hydrodynamic coupling of which the standstill braking moment is relatively small while at the same time providing a characteristic curve which is relatively steep within the range of small slippages.

Still another object of the present invention resides in the provision of a hydrodynamic coupling, especially for use in motor vehicles, in which a smooth starting is assured even when starting under heavy loads from standstill.

Figure 2:
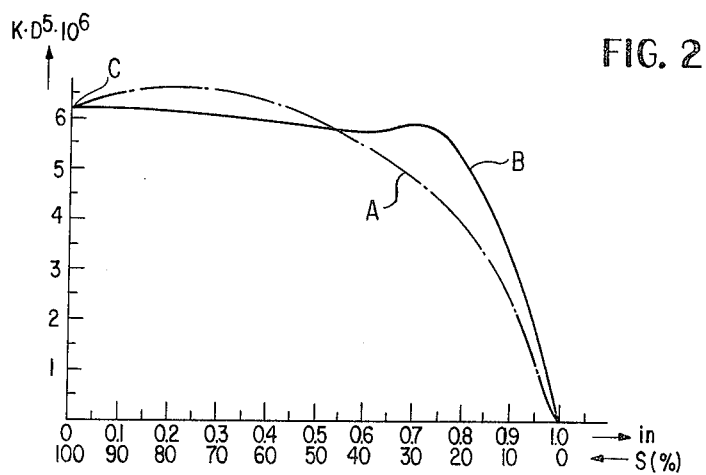

These and other objects, features and advantages of the present invention will become more obvious from the following description when taken in connection with the accompanying drawing which shows, for purposes of illustration only, one embodiment in accordance with the present invention, and wherein FIGURE 1 is a partial cross sectional view through a hydrodynamic coupling in accordance with the present invention, and FIGURE 2 is a schematic diagram of the characteristic curves of the hydrodynamic coupling in accordance with the present invention compared to those of the prior art constructions.

Referring now to FIGURE 1, reference numeral 10 generally designates therein the hydrodynamic coupling which consists, in a manner known per se, of a primary shell or impeller 11 and of a secondary shell or turbine 12 whereby the latter is operatively connected in any suitable manner with the output or driven shaft 13. The input or driving shaft 14 is operatively connected with the primary shell or impeller 11 by means of a housing part 15 surrounding the secondary shell 12.

The smooth inner walls 16 which face the flow circulation of the coupling liquid are in both shells 11 and 12 provided with cylindrical wall parts 17 within the outer area thereof. These cylindrical wall parts 17 are disposed in both shells 11 and 12 along the same diameter. With cast shells these wall parts 17 are constructed with a slight conical configuration in order to facilitate removal thereof, i.e., to facilitate pulling out the shells out of the casting mold. The transition of the inner walls 16 into the wall part 17 may take place also with a slight rounding off as is indicated in dash line in the secondary shell 12.

FIGURE 2 shows the characteristic curve A of a known coupling construction provided with deflection disks in comparison to the characteristic curve B of a coupling in accordance with the present invention. As may be clearly seen from FIGURE 2, both characteristics have practically the same standstill braking moment C. The coupling according to the present invention has, as clearly shown by curve B, within the area of small slippage, that is, approximately from zero to 25% slippage a considerably steeper rise than the curve A of the known coupling construction. Within the area of the remainder of the slippage, i.e., from approximately 30 to 100% the coupling according to the present invention shows an approximately horizontal configuration in the characteristic curve B thereof.

It should also be mentioned that the characteristic curve B may be achieved with a coupling of somewhat smaller diameter as compared to the known coupling.

By reason of the steeper portion of the characteristic curve within the operating range, there result for the coupling according to the present invention more favorable temperature conditions during driving operation which is another significant feature.

While I have shown and described one embodiment in accordance with the present invention, it is obvious that the same is not limited thereto, but is susceptible of many changes and modifications within the spirit and scope thereof. For example, the present invention is applicable to most types of hydrodynamic coupling irrespective of the constructional details thereof. Consequently, I do not wish to be limited to the details shown and described herein, but intend to cover all such changes and modifications as are encompassed by the scope of the appended claims.

I claim:

1. A hydrodynamic coupling, especially for the transmission of torque in motor vehicles, comprising a driving shaft, an impeller member, a turbine member and a driven shaft, a housing part drivably connecting said driving shaft and said impeller member and partially enclosing said turbine member, said turbine member being drivably connected to said driven shaft, means for journalling said housing member and said impeller member on said driven shaft, said impeller member and said turbine member each being provided with inner wall means facing the flow of the liquid of the hydrodynamic coupling and forming a chamber substantially toroidal, the sections of the inner wall means along the outer boundary of the flow circulation of said liquid being of approximately cylindrical configuration to thereby influence the operating characteristics of the coupling, and the approximately cylindrical sections of said inner wall means being disposed substantially along the same diameter in said impeller member and said turbine member, said inner wall means of said impeller member and said turbine member comprising outwardly extending arcuate sections joining respective ones of said sections of cylindrical configuration at an angle thereto, said housing part comprising an arcuate portion of substantially the same conformation as said arcuate section of said turbine member, said arcuate portion being parallel to said last-named arcuate section, said inner wall means of said impeller member and said turbine member comprising intermediate sections extending substantially radially of said driven shaft and merging smoothly with said outwardly extending sections, said inner wall means of said impeller member and said turbine member along the inner boundary of the flow of circulation of said liquid comprising arcuate portions of substantially identical curvature merging smoothly with said intermediate sections.

2. A hydrodynamic coupling according to claim 1, wherein said outwardly extending arcuate sections are of less cross-sectional arcuate extent than said arcuate portions of substantially identical curvature.

3. A hydrodynamic coupling according to claim 1, wherein said substantially toroidal chamber formed by said inner wall means is free of deflection means for said flow of liquid.

References Cited by the Examiner

UNITED STATES PATENTS

| 2,240,650 | 5/41 | Heyer | 60—54 X |
| 2,397,869 | 4/46 | Kirby. | |
| 2,510,898 | 6/50 | Meloy | 60—54 |
| 2,631,432 | 3/53 | Newcomb | 60—54 |
| 2,655,789 | 10/53 | MacKenzie | 60—54 |

JULIUS E. WEST, *Primary Examiner.*